(12) United States Patent
Herzog et al.

(10) Patent No.: US 9,160,737 B2
(45) Date of Patent: Oct. 13, 2015

(54) STATISTICAL SECURITY FOR ANONYMOUS MESH-UP ORIENTED ONLINE SERVICES

(75) Inventors: Shai Herzog, Bellevue, WA (US); Gil Shklarski, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 629 days.

(21) Appl. No.: 12/713,431

(22) Filed: Feb. 26, 2010

(65) Prior Publication Data

US 2011/0214174 A1    Sep. 1, 2011

(51) Int. Cl.
G06F 7/04 (2006.01)
H04L 9/32 (2006.01)
H04L 29/06 (2006.01)

(52) U.S. Cl.
CPC ........ H04L 63/0807 (2013.01); H04L 63/1416 (2013.01); H04L 63/20 (2013.01); *H04L 63/08* (2013.01); *H04L 63/0884* (2013.01)

(58) Field of Classification Search
CPC .. H04L 63/0807; H04L 63/0884; H04L 63/08
USPC ...................................... 726/29, 10; 713/168
See application file for complete search history.

(56) References Cited

U.S. PATENT DOCUMENTS

| 7,249,380 | B2 | 7/2007 | Yang |
| 2006/0218621 | A1 | 9/2006 | Covington et al. |
| 2006/0294196 | A1* | 12/2006 | Feirouz et al. ............... 709/217 |
| 2007/0192169 | A1* | 8/2007 | Herbrich et al. ............... 705/10 |
| 2007/0220597 | A1 | 9/2007 | Ishida |
| 2008/0071912 | A1 | 3/2008 | Moore et al. |
| 2008/0082662 | A1* | 4/2008 | Dandliker et al. ............ 709/225 |
| 2008/0141027 | A1 | 6/2008 | Kim et al. |
| 2008/0189164 | A1* | 8/2008 | Wiseman et al. ............... 705/10 |
| 2009/0100504 | A1 | 4/2009 | Conner, II et al. |
| 2009/0172781 | A1 | 7/2009 | Masuoka et al. |
| 2009/0193520 | A1* | 7/2009 | Buss ............................... 726/21 |
| 2009/0217351 | A1 | 8/2009 | Burch et al. |
| 2009/0222656 | A1 | 9/2009 | Rouskov et al. |
| 2009/0265198 | A1* | 10/2009 | Lester et al. ....................... 705/7 |
| 2009/0288144 | A1* | 11/2009 | Huber et al. ....................... 726/3 |
| 2012/0066497 | A1* | 3/2012 | Kumar et al. ................. 713/168 |

* cited by examiner

*Primary Examiner* — Aravind Moorthy
(74) *Attorney, Agent, or Firm* — Steven Spellman; Danielle Johnston-Holmes; Micky Minhas

(57) ABSTRACT

Web pages and applications commonly consume functionality provided by services to provide users with a rich experience. For example, a backend mapping service may provide access to these services. However, the users and application consuming the services may be anonymous and unverified. Accordingly, a two ticket validation technique is provided to validate service execution requests from anonymous applications. In particular, a user is provided with a client ticket comprising a reputation. The reputation may be adjusted over time based upon how the user consumes services. An application may request access to a service by providing the client ticket and an application ticket for validation. The reputation of the user may be used to determine an access level at which the application may access the service. Users with a high reputation may receive high quality access to the service, while users with a low reputation may receive lower quality access.

20 Claims, 15 Drawing Sheets

STATISTICAL SECURITY FOR ANONYMOUS MESH-UP ORIENTED ONLINE SERVICES

BACKGROUND

Today, websites and applications harness functionality provided by online services to simplify the development and testing of such websites and applications. In one example, a news website may provide news updates, weather information, stock tickers, movie searches, and a variety of other information and functionality to visitors. However, the news website may comprise merely a portion of the actual code functionality used to provide such information and services to visitors. Instead, the news website may consume online service to perform the functionality. For example, the news website may display weather information retrieved from a weather provider web service. Furthermore, services may be combined with client applications within a mesh environment. In this way, a vast array of websites and applications may consume these services to provide a robust experience to their users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for validating service execution requests from anonymous applications are disclosed herein. A web page, for example, may comprise an application that provides a particular functionality to a user (e.g., a nearest store locator). However, the application may connect to a service comprising the actual code that determines the nearest stores given a zip code and store name. Because anonymous users and applications may abuse services, it may be advantageous to provide validation and access throttling. Accordingly, as provided herein, a client ticket granting module may be configured to provide a user with a client ticket comprising a reputation. In one example, the client ticket may be stored as a cookie, such that the reputation may be updated and stored at a later point in time. The reputation corresponds to a level of trust of the user, which may initially start low for new users, but may be increased over time through "good" behavior.

The client ticket granting module may be configured to monitor service execution associated with the user. That is, the client ticket granting module may monitor how the user consumes services over time (e.g., monitor to see if behavior is good or abuse). The client ticket granting module may update the reputation of the client ticket based upon the monitored service execution (e.g., increase the reputation for good behavior or decrease the reputation for abusive behavior). In one example, the client ticket granting module may store reputation events logs, statistical pattern access models (e.g., a model of desired behavior that may be compared with monitored service execution to determine good/abusive behavior), and/or other data in a reputation data store.

A service policy manager may be configured to maintain service policies for services. In one example, a service policy may comprise reputation thresholds (e.g., 1-20, 21-55, and 56-100) and corresponding access levels (e.g., low, medium, and high). An access level defines the manner in which an application is allowed to access a service (e.g., high reputation may be mapped to immediate service, while a low reputation may be mapped to lower priority in the service's execution stack). A ticket validating module may be configured to receive a service execution request from an application with which the user is engaged. The service execution request may comprise an application ticket associated with the application and the client ticket associated with the user. In one example, the application ticket may be generated by a software emulation of a trusted platform module based upon the client ticket. The application ticket may correspond to a single instance of an application.

The ticket validating module may be configured to provide the application access to the service based upon validating the service execution request with a service policy for the service. In particular, the ticket validating module may match the reputation of the client ticket with a reputation threshold of the service policy. Then, the application may be validated at an access level corresponding to the respective reputation threshold. The application ticket may be validated based upon decoding a copy of the original client ticket stored in the application ticket. Once both tickets are validated, the application may access the service at the validated access level to perform service execution. It may be appreciated that the application may be denied access if the reputation of the client ticket is within a reputation threshold mapped to a denial of access.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
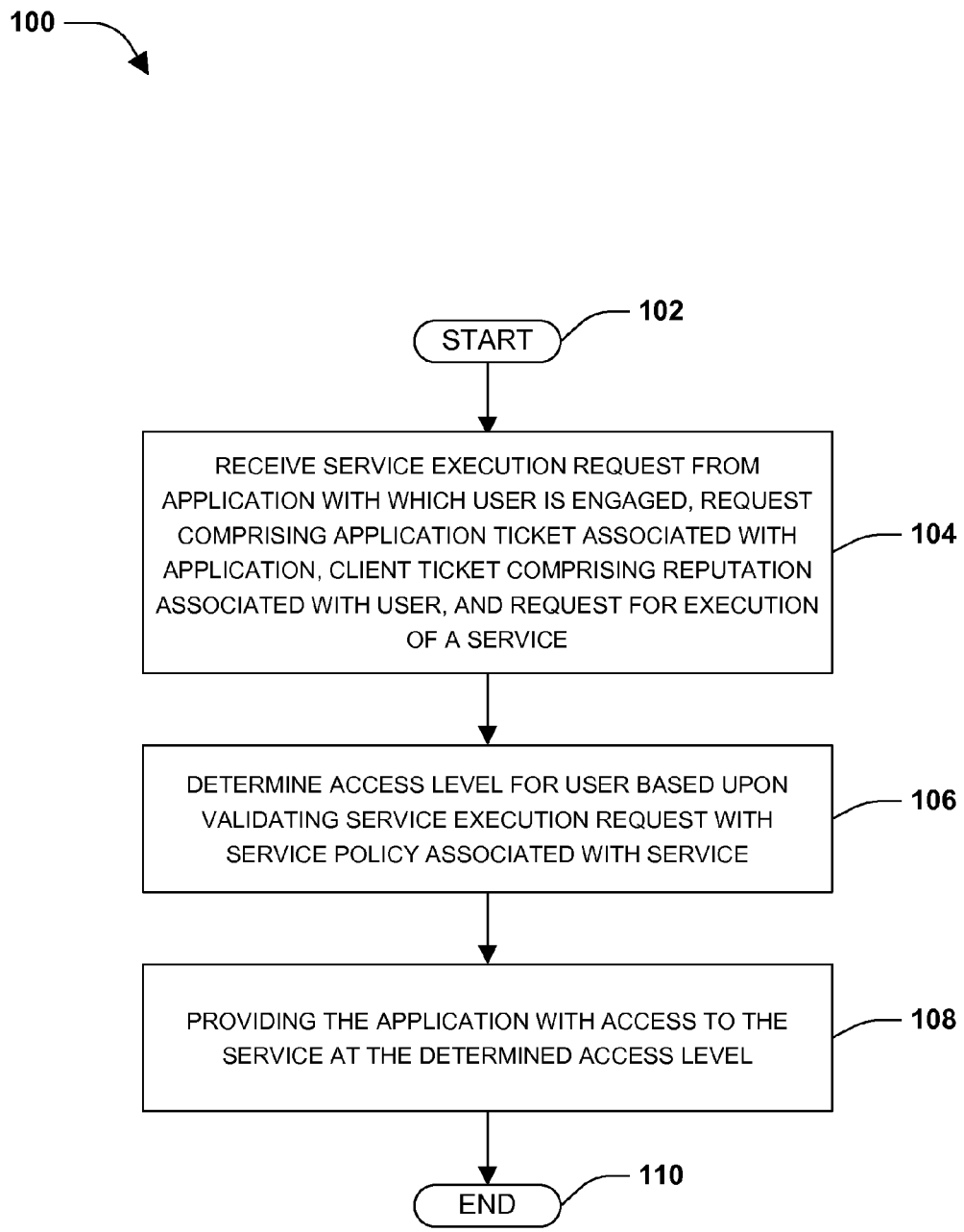
FIG. 1 is a flow chart illustrating an exemplary method of validating server execution requests from anonymous applications.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Over the years, the development of web pages and applications has evolved due in part to the availability of web services capable of performing many different types of functionality. Development has moved away from a single large application comprising a single source of code, and has moved towards applications drawing functionality from a variety of services. For example, a web page may provide a wide variety of application functionality to a user (e.g., weather, stock ticker, news headlines, etc.). However, the web page applications may utilize remote services to perform the actual code processing because the web page applications do not comprise the actual code. Furthermore, these web services may be utilized by hundreds of applications used by unverified users on unverified machines.

Recently, backend mapping services may provide access to a large collection of web services that may be consumed by applications as services. In one example, a pizza store may want to offer an application that provides a user with the nearest local pizza stores. However, the pizza store may not have the technology to make this determination. In this way, the pizza store may utilize a backend mapping service as a service configured to determine the nearest stores given a store name and a zip code. It may be appreciated that the backend mapping service may host an application and/or a service (e.g., a pizza store application and a store locator service may be hosted by a backend mapping service), or the backend mapping service may host just the service, while the application is configured on a website (e.g., a pizza store application is hosted on a pizza store's website, while a backend mapping service hosts a store locator service). It may be appreciated, however, that the systems and/or techniques described herein are not limited to a backend mapping service structure, but may be directed towards validating one or more (of the same or different types of) applications attempting to access functionality of one or more (of the same or different types of) services.

Unfortunately, a backend mapping service typically needs to allow unverified users (e.g., not verified through a server or a company website) to access its web services. This may leave the host of the service (e.g., the backend mapping service) vulnerable to abuse, such as service execution spamming that may overload the host. Additionally, the backend mapping service may have a payment reconciliation scheme, such that a developer/owner (e.g., the pizza store) of an application (e.g., the pizza store application) may be charged for usage of services (e.g., the nearest store locator). In this way, a user of an application may spam a service at such an intensive level that the developer/owner of the application ends up with a huge charge for the usage. In another example, a first application may attempt to impersonate a second application, such that the second application is charged for the first application's usage of services. In yet another example, the backend mapping service, operating under an advertisement compensation model, may over compensate a service because of an intense level of spamming by users of the service. In another case, the backend mapping service itself might be paying royalties to its data sources, such that serving extra bogus requests can cost the backend mapping service money (in addition to the computing resources). Additionally, there is the risk of systematic stealing of information (e.g. map vector data of an entire country), which is desirably reduced or eliminated.

Accordingly, one or more systems and/or techniques for validating service execution requests from anonymous applications are provided herein. A user and an application with which the user is engaged are validated using a two level ticket technique. The user may receive a client ticket comprising a reputation for the user. The client ticket may be saved as a cookie, for example, such that the reputation of the client ticket may be later updated based upon monitored consumption of services by the user. A software emulation of a trusted platform module may be configured on the client to generate an application ticket based upon the instance of the application and the client ticket. The application may validate itself for access to a service by sending the application ticket, the client ticket, and a request to access a service. The application ticket and/or client ticket may be validated against a service policy of the service to determine an access level at which the application may access the service.

One embodiment of validating server execution requests from anonymous applications is illustrated by an exemplary method 100 in FIG. 1. At 102, the method begins. At 104, a service execution request may be received from an application with which a user is engaged. In one example, the application may be incorporated into a web page (e.g., a pizza store web page). In another example, the application may be incorporated into a meshed-up mapping service website (e.g., a website comprising a variety of meshed up applications). The service execution request may comprise an application ticket associated with the application, a client ticket comprising a reputation associated with the user, and/or a request for execution of a service (e.g., a web service configured to determine a nearest set of stores given a store name and a zip code).

In one example, the client ticket may comprise encrypted and/or signed data of a client ID, reputation information, a respective application tickets key (e.g., a unique application tickets key) and/or state parameters of a client trusted platform (e.g., a software emulation of a trusted platform model). In particular, the client ticket may comprise a version, expiration information, other administration information, encryption and HMAC of (a client-id, reputation information, and/or expiration information) with a first key, and a private one-time delegation key for application tickets (namely, the application tickets key) derived by an HMAC algorithm using a second key.

In one example, the application ticket may comprise a copy of the client ticket without the application tickets key, encrypted and signed data of an application ID, application ticket expiration information, and/or state parameters of the client trusted platform using the application tickets key. In particular, the application ticket may comprise a version, expiration information, other administration information, a copy of the original client ticket (without the delegation key), an encryption and HMAC of (an application ID, expiration information, and/or state parameters) with the delegation key received with the client ticket.

At 106, an access level for the user may be determined based upon validating the service execution request with a service policy associated with the service. In particular, a reputation threshold may be determined based upon the reputation of the user falling within a reputation threshold specified in the service policy of the service. The access level for the application is the access level corresponding to the determined reputation threshold. In this way, the application ticket and/or the client ticket may be decoded and/or validated. In one example, the service policy may comprise one or more reputation thresholds (e.g., 1-30, 31-50, and 51-100) corresponding to one or more access levels (e.g., low, medium, and high).

In one example, the validation of the service execution request may comprise validating an application ID within the application ticket. For example, the application ID may be associated with a rank indicative of the application's level of trust. If the application has a high level of trust (e.g., no known fraud or spamming attempts were tried using this application), then the application may receive an increase access level to services, for example.

At 108, the application may be provided access to the service at the determined access level. For example, a new user may have a low reputation (e.g., 10). The low reputation may fall within a reputation threshold (e.g., 1-30) associated with a low access level. The low access level granted to the application may indicate that service execution between the application and the service may be given low priority and low bandwidth, for example. It may be appreciated that the determined access level may specify a denial of access to the service, thus the application may be denied access to the service.

It may be appreciated that the user may increase their reputation through "good behavior". That is, the user's consumption of services may be monitored to determine whether the usage is desired or abuse. In one example, an intensive level of consumption (e.g., spamming, or programmatically copying a large volume of data) of a service may be deemed as abusive behavior. In another example, a moderate consumption of a variety of services may be deemed as "good behavior" because it reflects typical humanistic consumption as opposed to a spamming or data stealing program. If the monitored consumption (access patterns) appears to be abusive, then the reputation within the client ticket may be decreased. Since client tickets are authentic and have a limited lifetime, they need to be renewed by the system from time to time. This helps to enforce a reputation decrease (users cannot keep using their older ticket with a better reputation). If the monitored consumption (access patterns) appears to be typical or desired, then the reputation within the client ticket may be increased.

Access patterns of one or more services (e.g., a plurality of services hosted by a backend mapping service) may be monitored for attacks and/or other abuse. If an attack or abuse is detected, then reputation thresholds within service policies of one or more services may be increased. For example, a service policy may originally comprise a low access level with a reputation threshold of 1-30, a medium access level with a reputation threshold of 31-60, and a high access level with a reputation threshold of 61-100. Upon a detected attacked, the service policy may be modified such that access is denied to users with a reputation between 1-35, while users with a reputation between 36-60 may be granted a medium access level and users with a reputation between 61-100 may be granted a high access level. In this way, degree of access granted to users with a lower reputation (e.g., bad users or new users) may be drastically reduced to mitigate potential attacks from the lower reputation users. It may be appreciated that a user may be granted a chance to increase their reputation by answering a challenge question or authenticating (e.g., logging into an account) to prove that the user may be trusted and/or is a human. At 110, the method ends.

Figure 2:
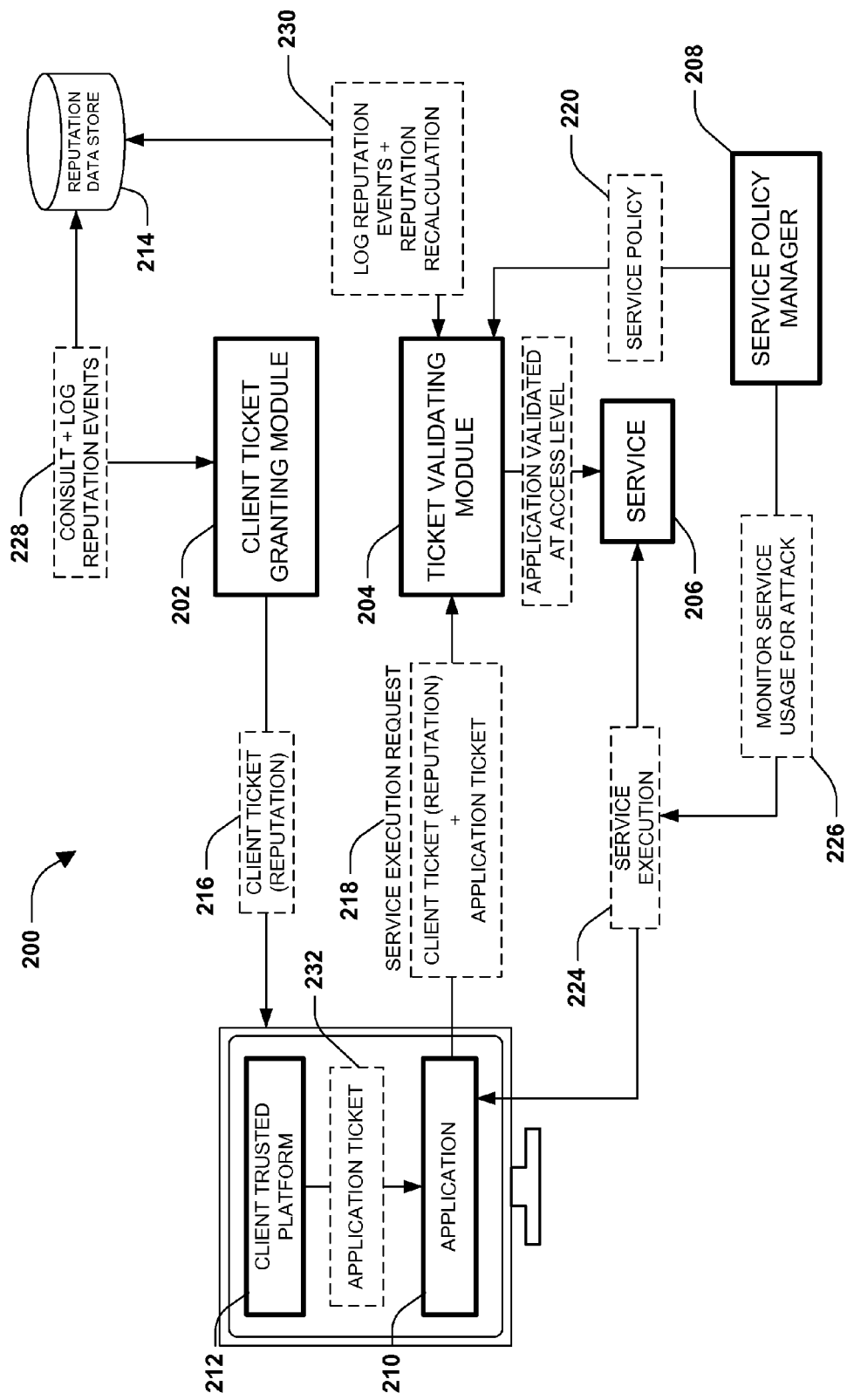
FIG. 2 is a component block diagram illustrating an exemplary system for validating server execution requests from anonymous applications.

FIG. 2 illustrates an example of a system 200 configured for validating service execution requests from anonymous applications. The system 200 may comprise a client ticket granting module 202, a ticket validating module 204, a service policy manager 208, and/or a reputation data store 214. The client ticket granting module 202 may be configured to provide a user with a client ticket 216 comprising a reputation. It may be appreciated that some users may already have a client ticket (e.g., a client ticket stored as a cookie comprising a reputation adjusted over time by the client ticket granting module 202). In such a case, the client ticket granting module 202 may refrain from sending another client ticket to the user.

The client ticket granting module 202 may be configured to monitor consumption of services (e.g., service execution 224) associated with the user to determine whether to update the reputation of the client ticket 216. For example, the client ticket granting module 202 may decrease the reputation of the user within the client ticket 216 based upon detecting abusive patterns, non-humanistic behavior, spamming, multiple IP addresses, multiple subnets, non-natural network identities, non-natural access patterns, etc. In one example, the client ticket granting module 202 may update the reputation of the user to effectively ban the user from consuming services (e.g., reputation=−1). In contrast, the client ticket granting module 202 may increase the reputation of the user based upon detecting humanistic behavior, behavior matching desired behavior specified in a statistical pattern access model, and/or other typical/non-abusive consumption of services.

It may be appreciated that the client ticket granting module 202 may be configured to provide a reputation challenge to the user. If the user answers the reputation challenge correctly, then the reputation may be increased. The client ticket granting module 202 may increase the reputation of the user based upon the user logging into an account for validation. Furthermore, the client ticket granting module 202 may consult and/or log reputation events in the reputation data store 214. In one example, the reputation data store 214 may comprise reputation event logs and/or statistical pattern access models.

In one example, a client machine of the user may be configured with a client trusted platform 212 configured to receive the client ticket 216 from the client ticket granting module 202 and generate an application ticket 232 for an application 210 based upon the client ticket 216 and other information regarding the application 210. The ticket validating module 204 may be configured to receive a service execution request 218 comprising the client ticket 216, the application ticket 232, and/or a request for execution of a service 206. The ticket validating module 204 may be configured to provide the application 210 with access to the service 206 by validating the service execution request 218 with a service policy 220 associated with the service 206. In one example, the service policy 220 may comprise reputation thresholds per respective applications (e.g. each application) and corresponding access levels. It may be appreciated that different applications may comprise respective reputation thresholds, where the respective thresholds of the different applications may or may not be different from one another. The ticket validating module 204 may be configured to validate the service execution request 218 by matching the reputation of the user to a reputation threshold within the service policy 220. The application 210 may be granted an access level associated with the reputation threshold matching the reputation of the user. To facilitate the matching of reputation to reputation threshold, the service policy 220 may be implemented as a lookup table. Furthermore, the ticket validating module 204 may be configured to log reputation events, for example in the reputation data store 214, and/or invoke a reputation recalculation.

The service policy manager 208 may be configured to maintain the service policy 220 for the service 206. In one example, the service policy manager 208 may adjust one or more reputation thresholds within the service policy 220 based upon monitoring consumption of services by one or more users (e.g., service execution 224) for attacks and/or abusive behavior. That is, the reputational requirement that a user must possess for a specific access level may be increased. In another example, the service policy manager 208 may increase one or more reputation thresholds based upon detecting an attack one or more services (e.g., an attack on multiple services hosted by a backend mapping service). In this way, services may be protected from the attack based upon an increase in reputational requirements. Moreover, in situations where a client trusted platform is utilized, the application itself may serve as a parameter in the policy. In this way, some applications may get priority over others.

It may be appreciated that the client ticket granting module 202 and the ticket validating module 204 may be configured to instantly (or substantially instantly) revoke a ticket (e.g., a client ticket 216) of a "bad" user, such that the "bad" user is blocked for accessing services. For example, the client ticket granting module 202 may be configured to inform the ticket validating module 204 that one or more tickets are invalid and should not be honored (e.g., the ticket validating module 204 should reject service execution requests associated with invalid tickets), regardless of whether ticket expirations times of the tickets have expired or not.

Figure 3:
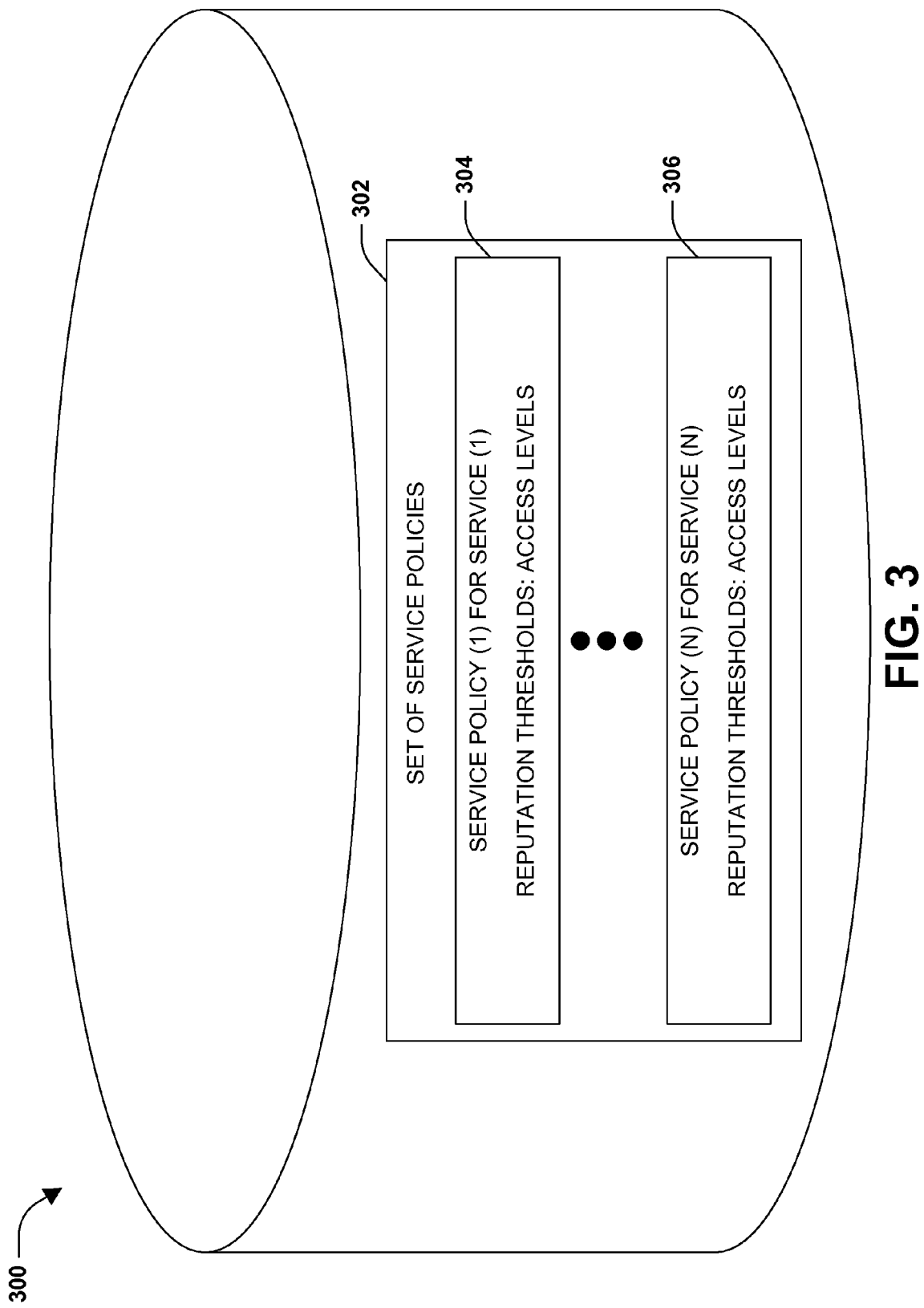
FIG. 3 is an illustration of an example of a set of service policies maintained by a service policy manager.

FIG. 3 is an illustration of an example of a set of service policies 302 maintained by a service policy manager. The set of service policies 302 may comprise one or more service policies. For example, the set of service policies 302 may comprise a first service policy 304 associated with a first service. The set of service policies 302 may comprise other service policies, such as service policy (N) 306 for service (N). A service policy may comprise reputation thresholds and corresponding access levels. A user's reputation, as specified in a client ticket, may be matched with a reputation threshold of a service policy of a service a user desires to consume. The access level corresponding to the reputation threshold may be provided to the user. The access level defines the quality and/or type of access the user is allowed when interacting with the service (e.g., an amount of bandwidth, an execution priority, a delay time in requests, etc.).

Figure 4:
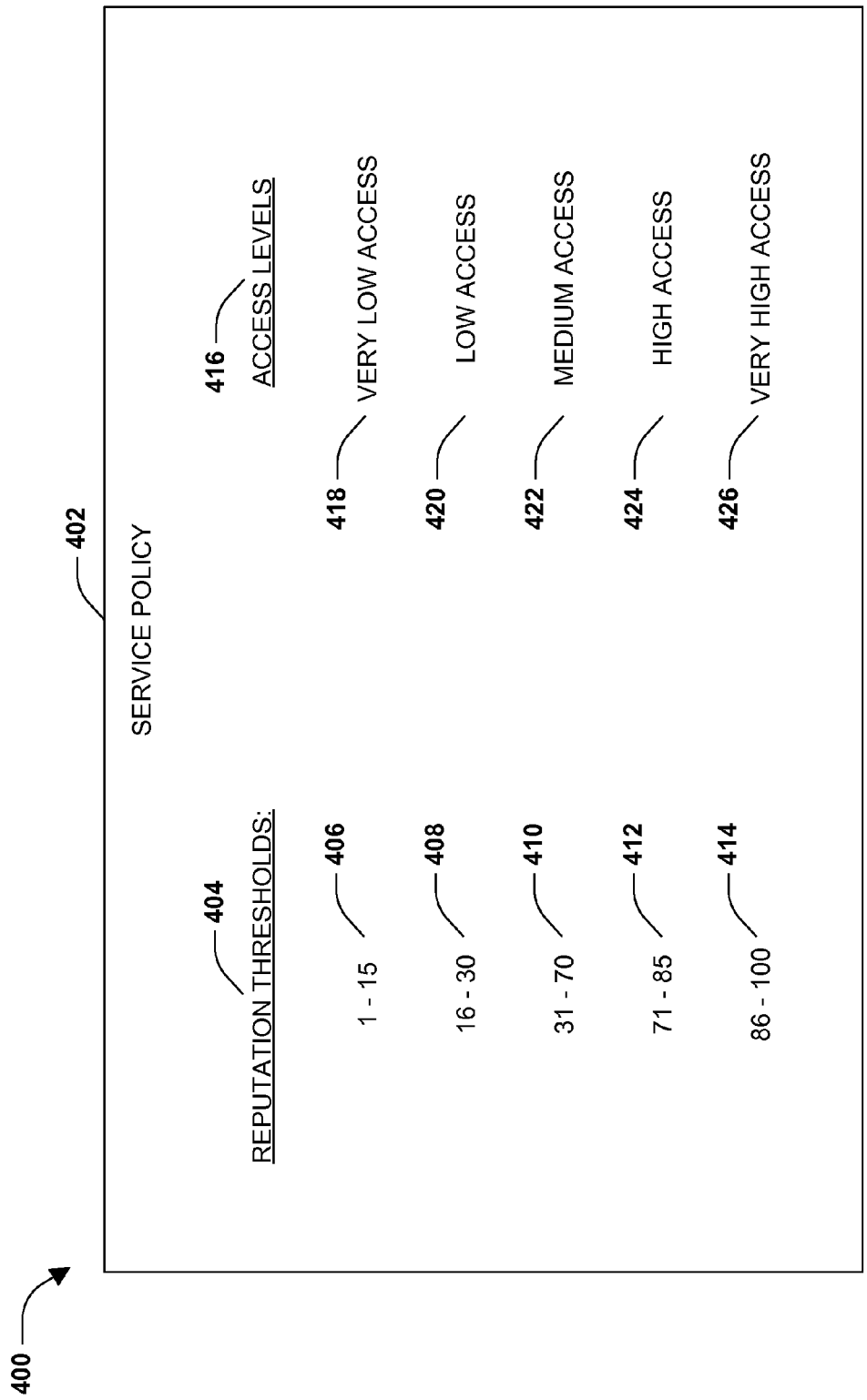
FIG. 4 is an illustration of an example of a service policy associated with a service.

FIG. 4 is an illustration of an example 400 of a service policy 402 associated with a service. It may be appreciated that a service policy may be associated with one or more services of an application. It may be appreciated that a first service policy of a first application may comprise different reputation thresholds (e.g., levels of trust) than a second service policy of a second application. The service policy 402 may comprise reputation thresholds 404 and corresponding access levels 416. In one example, a first reputation threshold 406 may comprise a range of reputations from 1 to 15. The first reputation threshold 406 may be associated with a very low access 418. In this way, users with a very low reputation (e.g., 1 to 15) may be granted very low access 418 to the service. A second reputation threshold 408 may comprise a range of reputations from 16 to 30. The second reputation threshold 408 may be associated with a low access 420. In this way, users with a low reputation (e.g., 16 to 30) may be granted low access 420 to the service. A third reputation threshold 410 may comprise a range of reputations from 31 to 70. The third reputation threshold 410 may be associated with a medium access 422. In this way, users with a medium reputation (e.g., 31 to 70) may be granted medium access 422 to the service.

A fourth reputation threshold 412 may comprise a range of reputations from 71 to 85. The fourth reputation threshold 412 may be associated with a high access 424. In this way, users with a high reputation (e.g., 71 to 85) may be granted high access 424 to the service. A fifth reputation threshold 414 may comprise a range of reputations from 86 to 100. The fifth reputation threshold 414 may be associated with a very high access 426. In this way, users with a very high reputation (e.g., 86 to 100) may be granted very high access 424 to the service.

It may be appreciated that a user with a higher access level (e.g., high access 424) than a user with a lower access level (e.g., medium access 422) may be allocated a higher execution priority, more bandwidth, and a faster response time when interacting with a service. In this way, a "good" user is rewarded for exhibiting desired usage/behavior over time with increased reputation that allows for higher access levels and thus better service when interacting with services.

Figure 5:
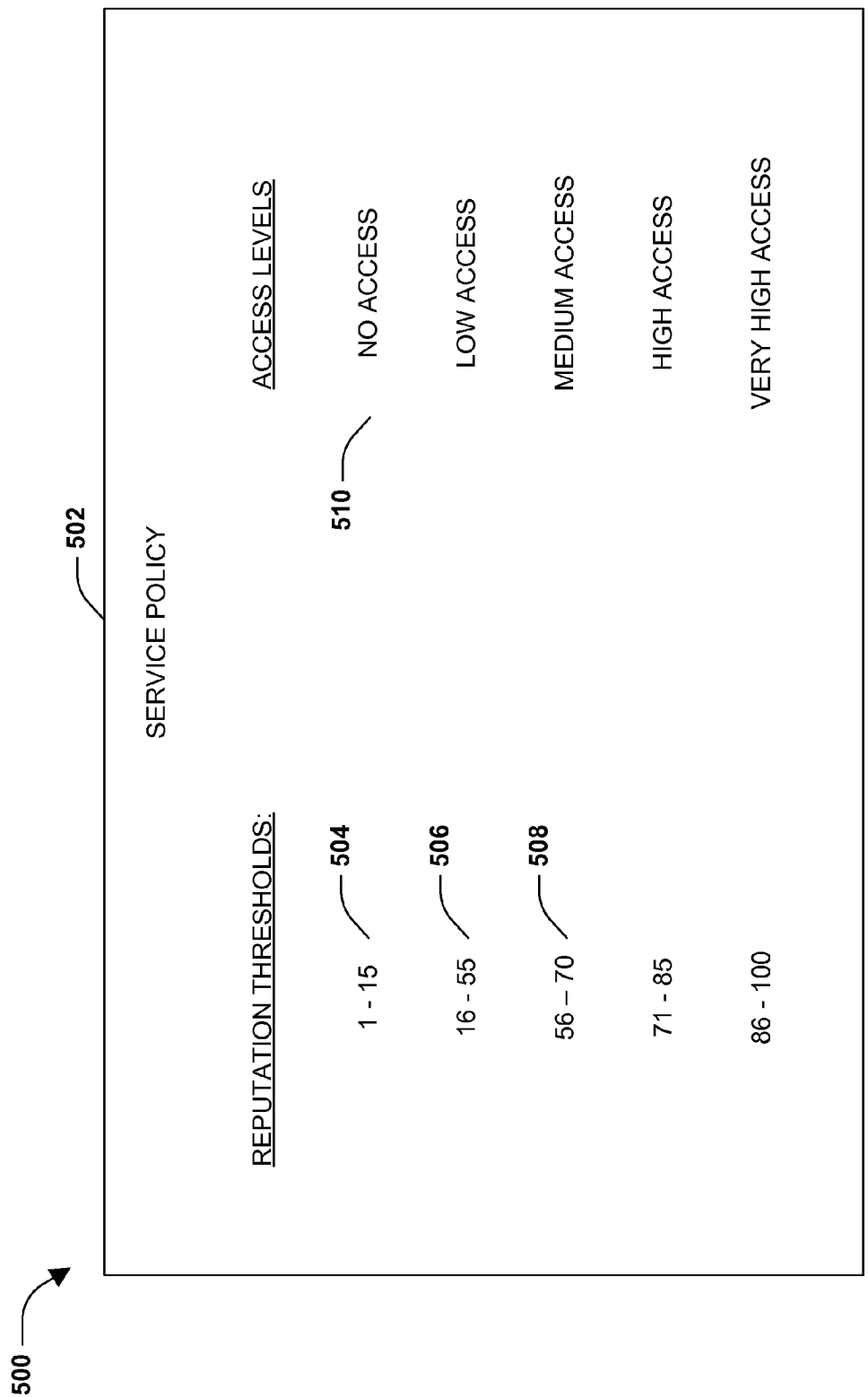
FIG. 5 is an illustration of an example of a service policy updated after a detected attack.

FIG. 5 is an illustration of a service policy 502 updated after a detected attack. It may be appreciated that the service policy 502 may have previously had reputation thresholds and access levels as illustrated in FIG. 4 before the detected attack. Upon detecting the attack/abuse, a service policy manager may update the reputations thresholds and/or access levels within the service policy 502 to protect a service associated with the service policy 502 from attack/abuse by untrusted users having lower reputations.

In one example, a first reputation threshold 504 comprising a range of reputations from 1 to 15 may be updated, such that the first reputation threshold 504 is associated with a no access 510. That is, users with a reputation between 1 and 15 may be denied access to the service. Furthermore, a second reputation threshold 506 and a third reputation threshold 508 may be adjusted with new reputation ranges. For example, the second reputation threshold 504 is updated to encompass a broader range of reputations associated with low access.

Figure 6:
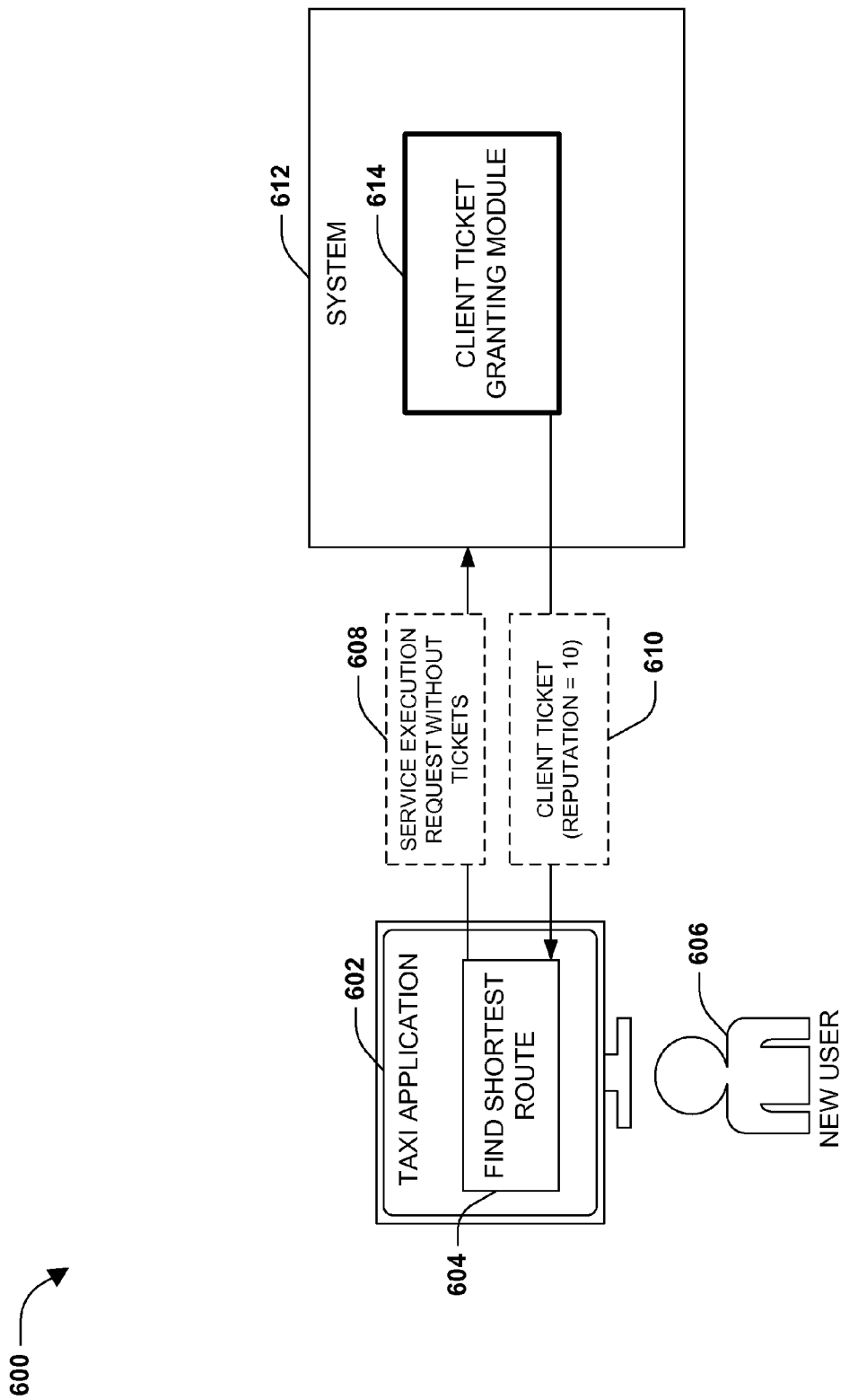
FIG. 6 is an illustration of an example of a client ticket granting module providing a new user with a client ticket comprising a low reputation.

FIG. 6 is an illustration of an example 600 of a client ticket granting module 614 providing a new user 606 with a client ticket 610 comprising a low reputation. In one example, the new user 606 may engaged with a taxi application 602. The taxi application 602 may be configured to provide the new user 606 with a find shortest route functionality 604 that allows the user to find the shortest taxi route between two places. However, the taxi application 602 may not comprise the actual code used to find the shortest route. In this way, the taxi application 602 may send a service execution request 608 without tickets to a system 612 configured to grant access to a route mapping service comprising the actual code functionality to find the shortest route. The service execution request 608 does not comprise tickets because the new user 606 has not been assigned a client ticket yet.

Upon receiving the service execution request 608 without tickets, the client ticket granting module 614 may be configured to provide the new user 606 with the client ticket 610. The client ticket 610 may comprise a low reputation because the new user may not be trusted as of yet. However, over time, the reputation of the client ticket 610 may be increased based upon "good behavior".

In another example, a client application (e.g., the taxi application 602) may first make a determination as to whether an application ticket and/or a client ticket have already been granted. If both tickets have been granted, then the client application may make a service execution request using the two tickets. If the application ticket and/or the client ticket have not been granted, then the client application may request the missing ticket(s) (e.g., a client ticket may be requested from the client ticket granting module 614). In this way, the client application would refrain from performing the service execution request without tickets 608. That is, the client application would refrain from making service execution requests without first obtaining a client ticket and an application ticket.

Figure 7:
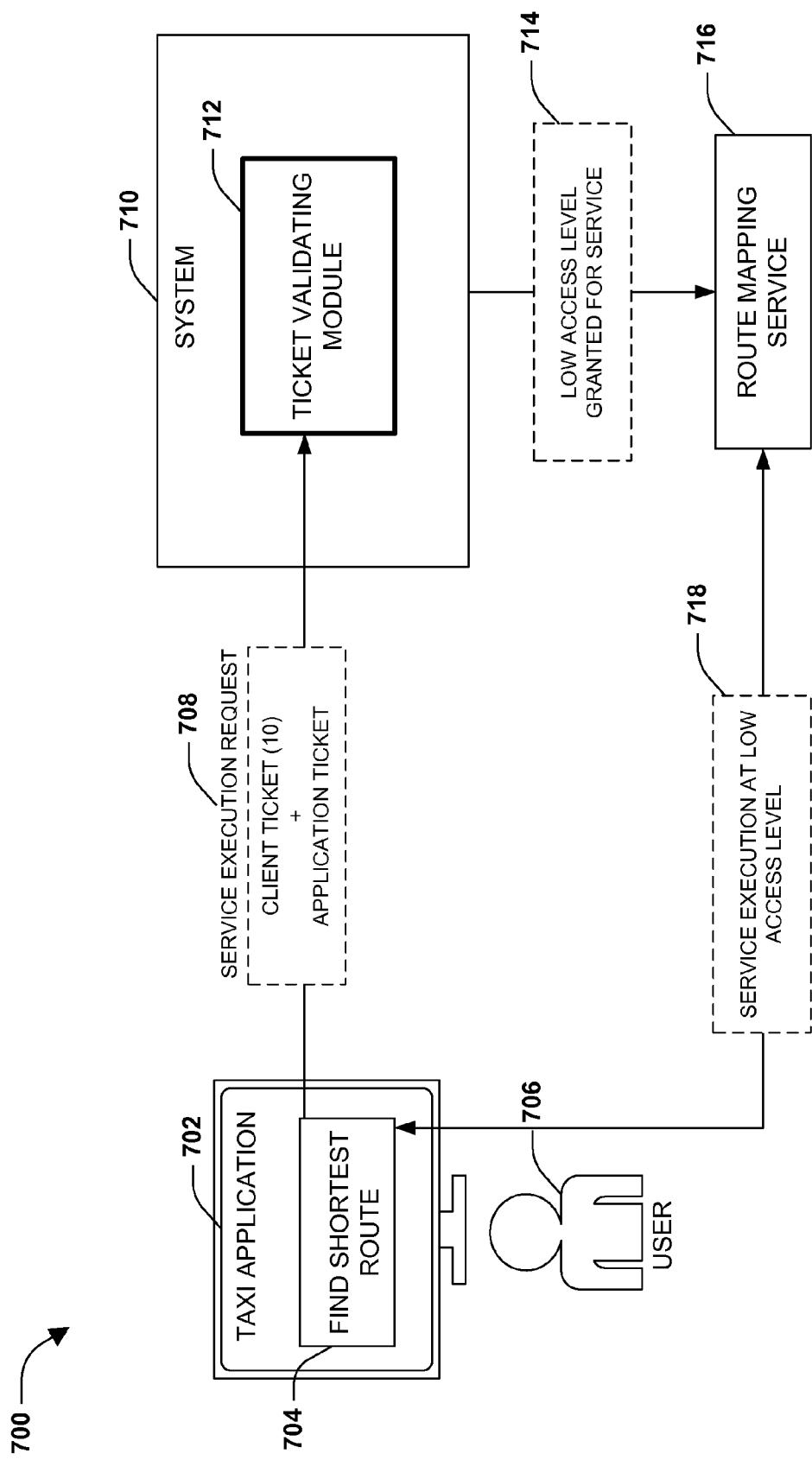
FIG. 7 is an illustration of an example of a ticket validating module granting a taxi application with a low access level to a route mapping service.

FIG. 7 is an illustration of an example 700 of a ticket validating module 712 granting a taxi application 702 with a low access level 714 to a route mapping service 716. In one example, a user 706 may have a client ticket with a reputation of 10. The user 706 may invoke the taxi application 702 to provide a find the shortest route functionality 704. However, the taxi application 702 may not comprise the actual code used to find the shortest route. An application ticket may be derived from the client ticket and the instance of the taxi application 702. In this way, the taxi application 702 may send a service execution request 708 comprising the client ticket, the application ticket, and a request for execution of the route mapping service 716 to the system 710 configured to grant access to the route mapping service 716 comprising the actual code functionality to find the shortest route. Upon receiving the service execution request 708, the ticket validating module 712 may grant the taxi application 702 with the low access level 714 based upon the user's low reputation of 10 matching a low reputation threshold corresponding to the low access level 714 within a service policy of the route mapping service 716. Upon validation, the taxi application 702 may perform service execution 718 with the route mapping service 716 at the low access level 714.

Figure 8:
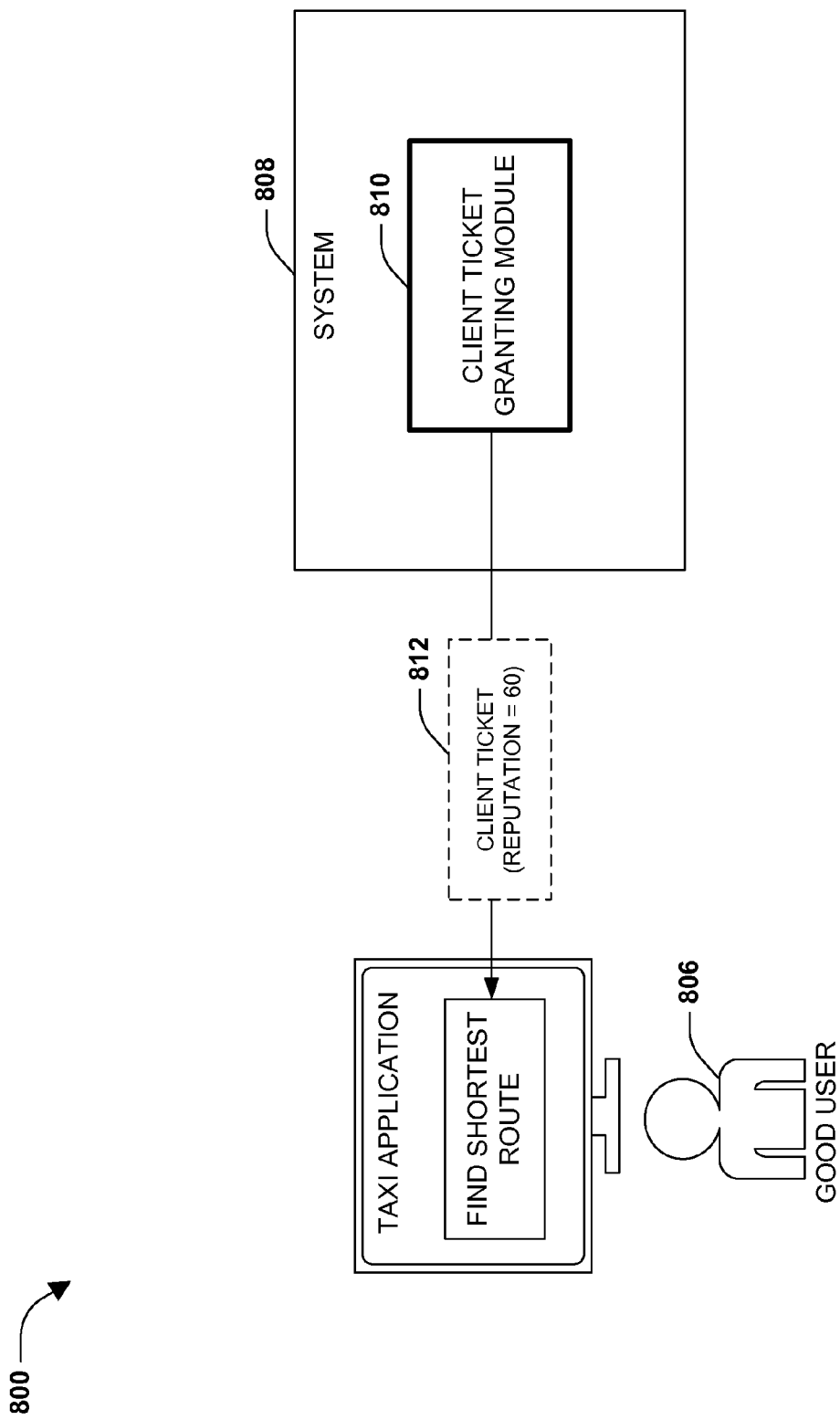
FIG. 8 is an illustration of an example of a client ticket granting module updating a reputation of a client ticket associated with a good user.

FIG. 8 is an illustration of an example 800 of a client ticket granting module 810 updating a reputation of a client ticket 812 associated with a good user 806. In one example, the client ticket granting module 810 may monitor service consumption patterns by the good user 806. It may be appreciated that the client ticket granting module 810 may monitor the good user's behavior when consuming a wide variety of services using one or more applications over a period of time (e.g., 20 seconds, 1 month, a year, etc.). Upon determining the good user 806 has exhibited typical or desired service consumption patterns, the client ticket granting module 810 may update the reputation of the client ticket 812 from 10 to 60.

In another example, the client ticket granting module 810 does not "push" reputation updates to the client (e.g., the good user 806). Instead, it is the client's responsibility to make a call to the client ticket granting module 810 to request a new client ticket with an updated reputation. For example, the client may comprise client logic configured to determine when to "refresh" the client ticket from the client ticket granting module 810, such that the client will receive a new client ticket with an updated reputation. It may be appreciated that in one example, a client reputation ticket may comprise a ticket expiration time. If a client does not refresh the client ticket before the ticket expiration time expires, then the client may be left without a valid client reputation ticket. In this way, client logic may be configured to request a new client ticket comprising an updated reputation and a new ticket expiration time.

Figure 9:
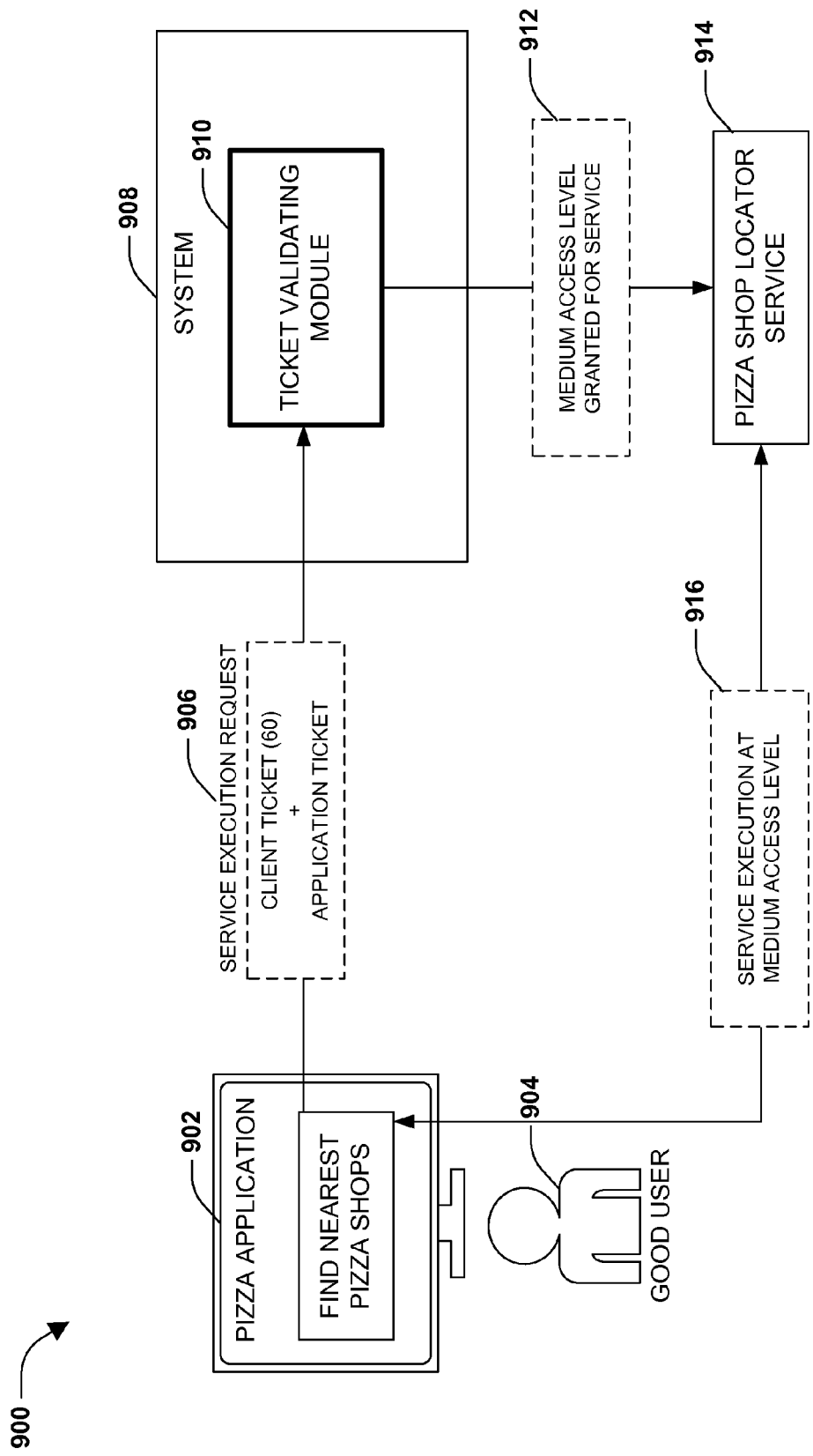
FIG. 9 is an illustration of an example of a ticket validating module granting a pizza application with a medium access level to a shop locator service.

FIG. 9 is an illustration of an example 900 of a ticket validating module 910 granting a pizza application 902 with a medium access level 912 to a shop locator service 914. In one example, a good user 904 may have a client ticket with a reputation of 60 that the good user 904 built up over time. The good user 904 may invoke a pizza application 902 to provide a list of the nearest pizza shops based upon a zip code inputted by the good user 904. However, the pizza application 902 may not comprise the actual code used to find the nearest pizza shops. An application ticket may be derived from the client ticket and the instance of the pizza application 902. In this way, the pizza application 902 may send a service execution request 906 comprising the client ticket, the application ticket, and a request for execution of a pizza shop locator service 912 to the system 908 configured to grant access to the pizza shop locator service 912. Upon receiving the service execution request 906, the client ticket and or the application ticket may be validated. In this way, the ticket validating module 910 may grant the pizza application 902 with the medium access level 912 based upon the user's medium reputation of 60 matching a medium reputation threshold associated with the medium access level 912 within a service policy of the pizza shop locator service 914. Upon validation, the pizza application 902 may perform service execution 916 with the pizza shop locator service 914 at the medium access level 912.

Figure 10:
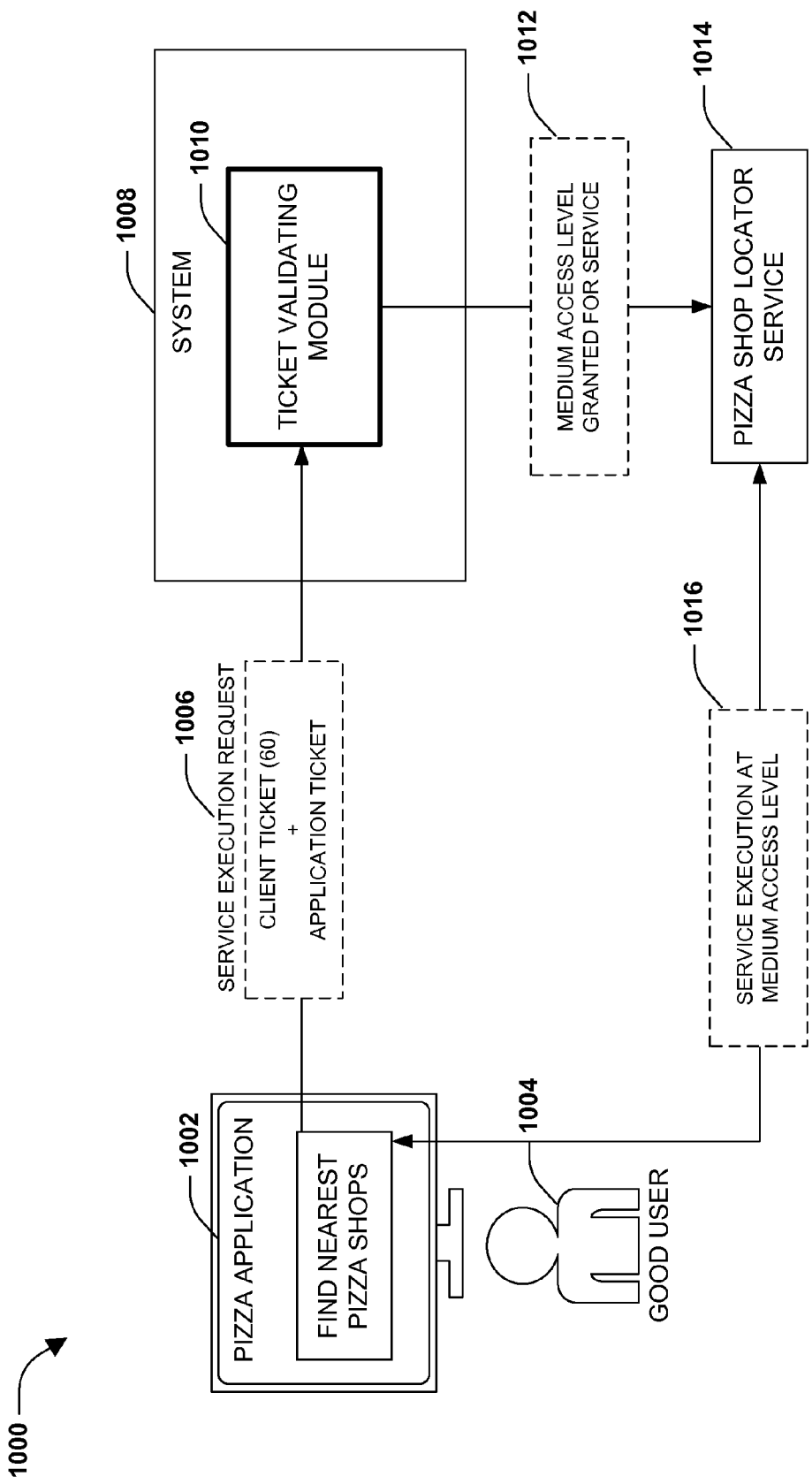
FIG. 10 is an illustration of an example of a ticket validating module granting a pizza application with a medium access level to a shop locator service despite a detected attack on a host of the pizza shop locator service.

FIG. 10 is an illustration of an example 1000 of a ticket validating module 1010 granting a pizza application 1002 with a medium access level 1012 to a shop locator service 1014 despite a detected attack on a host of the pizza shop locator service 1014. In one example, a good user 1004 may have a client ticket with a reputation of 60 that the good user 1004 built up over time. The good user 1004 may invoke the pizza application 1002 to provide a list of the nearest pizza shops based upon a zip code inputted by the good user 1004. However, the pizza application 1002 may not comprise the actual code used to find the nearest pizza shops. An application ticket may be derived from the client ticket and the instance of the pizza application 1002. In this way, the pizza application 1002 may send a service execution request 1006 comprising the client ticket, the application ticket, and a request for execution of a pizza shop locator service 1012 to the system 1008 configured to grant access to the pizza shop locator service 1012.

In one example, a service policy manager may detect an attack on a host of the pizza shop locator service 1014. For example, a bad user may consume one or more services at an intense level (e.g. for the reasons detailed in [0034] [0026]). Upon detecting the attack, the service policy manager may adjust reputation thresholds within one or more service policies (e.g., a service policy for the pizza shop locator service 1014). The goal of increasing reputation thresholds may be to restrict access of untrusted users with lower reputations (e.g., reputations below 50), such that their granted level of access mitigates the ability of the lower reputation users to attack the host (e.g., the untrusted users may be restricted to long wait intervals between requests). It may follow that reputation thresholds comprising high reputations may remained unchanged, such that users with higher reputations (e.g., reputations above 50) may be unaffected because these users are deemed as trusted.

Upon receiving the service execution request 1006, the ticket validating module 1010 may grant the pizza application 1002 with the medium access level 1012 based upon the user's medium reputation of 60 matching a medium reputation threshold associated with the medium access level 1012 within a service policy of the pizza shop locator service 1014. Upon validation, the pizza application 1002 may perform service execution 1016 with the pizza shop locator service 1014 at the medium access level 1012.

Figure 11:
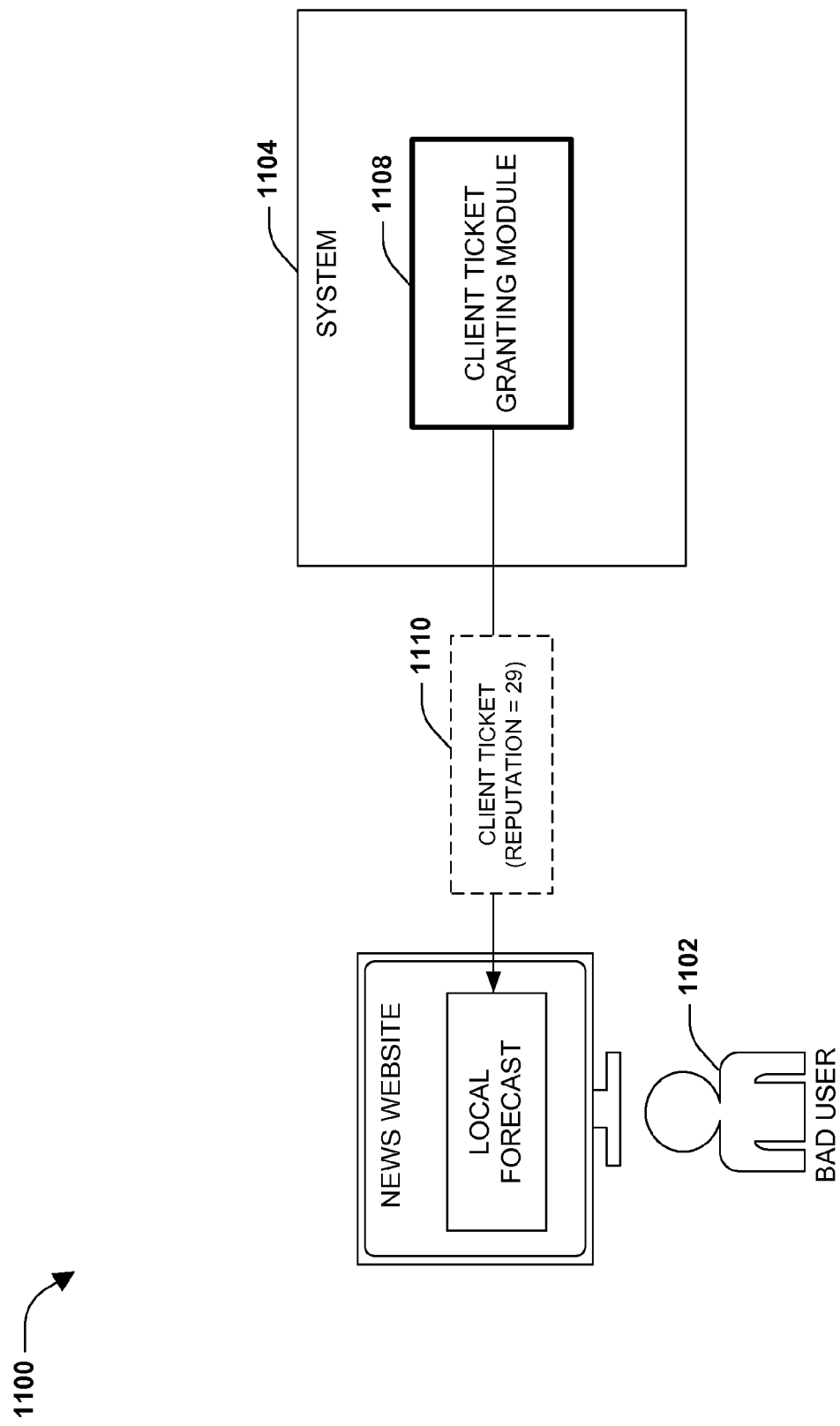
FIG. 11 is an illustration of an example of a client ticket granting module updating a reputation of a client ticket associated with a bad user.

FIG. 11 is an illustration of an example 1100 of a client ticket granting module 1108 updating a reputation of a client ticket 1110 associated with a bad user 1102. In one example, the client ticket granting module 1108 may monitor service consumption patterns by the bad user 1102. It may be appreciated that the client ticket granting module 1108 may monitor the bad user's behavior when consuming a wide variety of services using one or more applications over a period of time. Upon determining the bad user 1102 has exhibited abusive behavior patterns, the client ticket granting module 1108 may decrease the reputation of the client ticket 1110 from 60 to 29.

Figure 12:
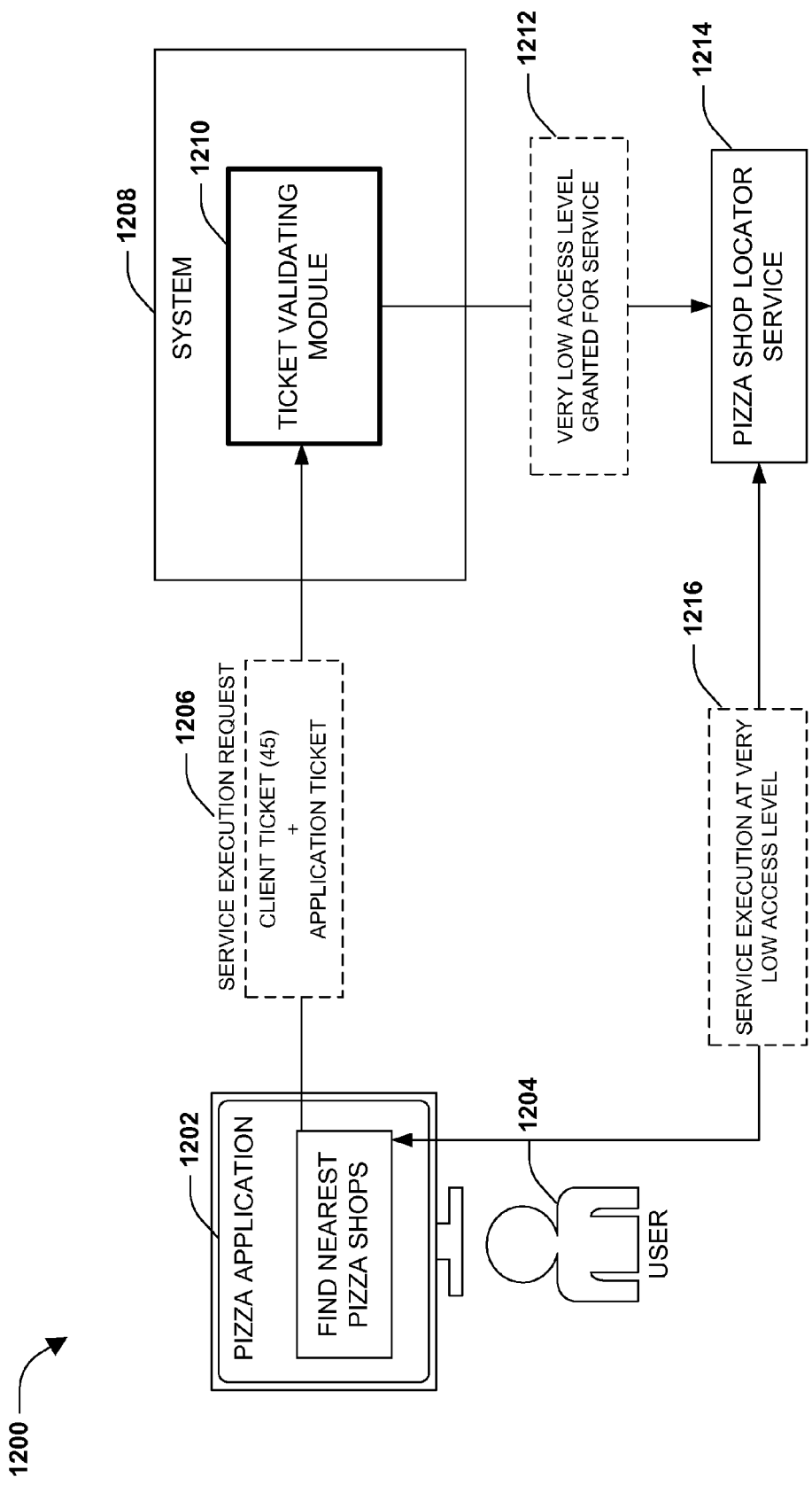
FIG. 12 is an illustration of an example of a ticket validating module granting a pizza application with a very low access level to a pizza shop locator service, which would otherwise be granted a medium access level, based upon a detect attack on a host of the pizza shop locator service.

FIG. 12 is an illustration of a ticket validating module 1210 granting a with a pizza application 1202 very low access level 1212 to a shop locator service 1214, which would otherwise be granted a medium access level, based upon a detect attack on a host of the pizza shop locator service 1214. In one example, a user 1204 may have a client ticket with a reputation of 45 that the user 1204 built up over time. The user 1204 may invoke the pizza application 1202 to provide a list of the nearest pizza shops based upon a zip code inputted by the user 1204. However, the pizza application 1202 may not comprise the actual code used to find the nearest pizza shops. An application ticket may be derived from the client ticket and the instance of the pizza application 1202. In this way, the pizza application 1202 may send a service execution request 1206 comprising the client ticket, the application ticket, and a request for execution of the pizza shop locator service 1214 to the system 1208 configured to grant access to the pizza shop locator service 1214.

In one example, a service policy manager may detect an attack on a host of the pizza shop locator service 1214. For example, a bad user may spam one or more services at an intense level. Upon detecting the attack, the service policy manager may adjust reputation thresholds within a service policy for the pizza shop locator service 1214. The goal of increasing reputation thresholds may be to restrict access of untrusted users with lower reputations (e.g., reputations below 50) to mitigate the untrusted user's ability to attack the host by providing lower access (e.g., slower access). It may be appreciated that the user's reputation of 45 may have previously mapped to a medium access level. However, the adjusted reputation thresholds may now map the user's reputation of 45 to a very low access level because the user's reputation of 45 is not trusted.

Upon receiving the service execution request 1206, the ticket validating module 1210 may grant the pizza application 1202 with the very low access level 1212 based upon the user's very low reputation of 45 matching a very low reputation threshold associated with the very low access level 1212 within a service policy of the pizza shop locator service 1214. Upon validation, the pizza application 1202 may perform service execution 1216 with the pizza shop locator service 1214 at the very low access level 1212.

Figure 13:
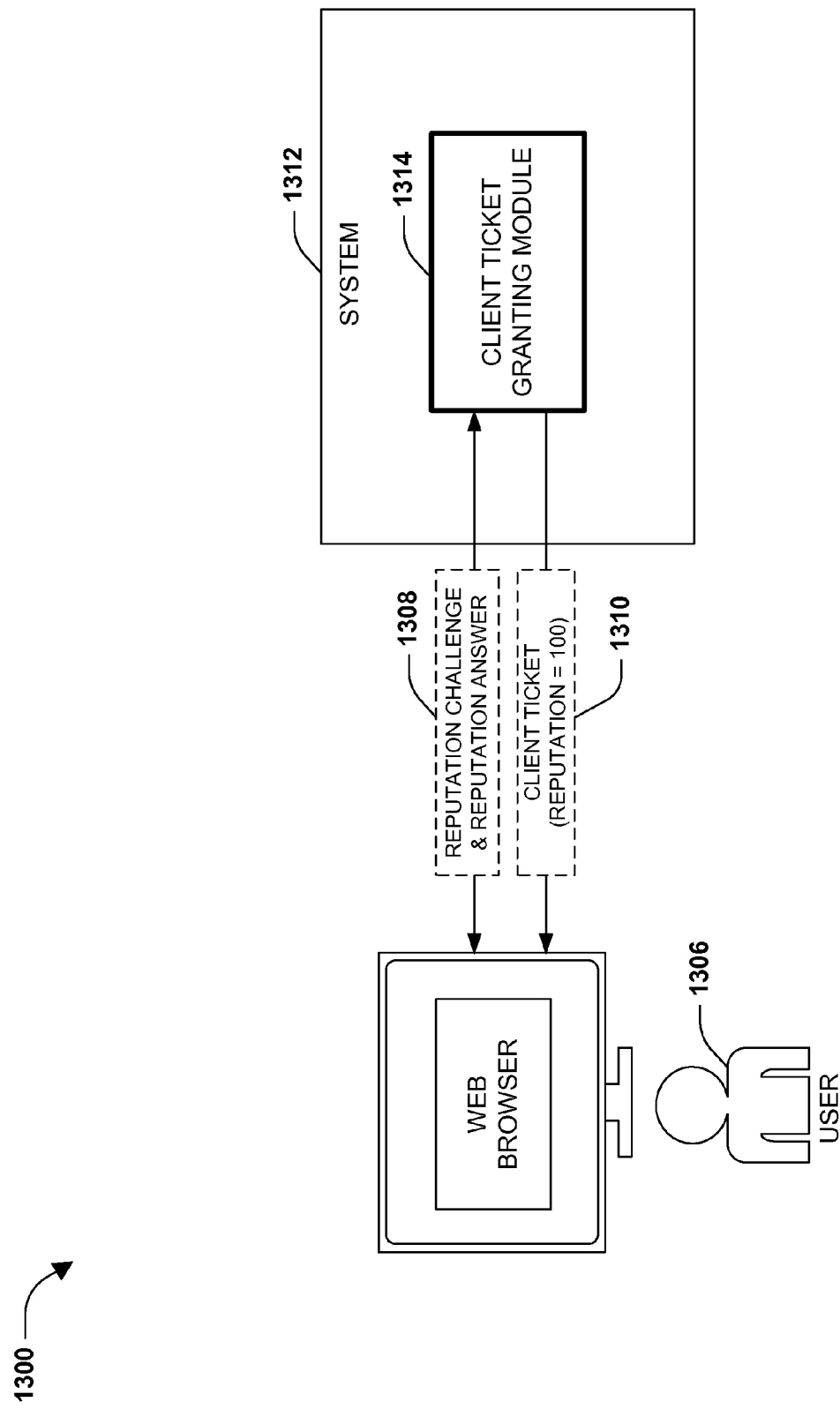
FIG. 13 is an illustration of an example of a user answering a reputation challenge question to raise a reputation of the user in real-time.

FIG. 13 is an illustration of a user 1306 answering a reputation challenge question to raise a reputation of the user 1306 in real-time. In one example, the user 1306 may have had a client ticket comprising a high reputation of 70. However, the user 1306 may have been compromised by malicious software that attacked services associated with the system 1312, thus resulting in a lower reputation of 15. A client ticket granting module 1314 may allow the user 1306 to improve their reputation by providing a reputation challenge 1308 to the user 1306. The user 1306 may answer the reputation challenge 1308 to prove that the user 1306 is can be trusted and/or is human. For example, the user 1306 may answer specific questions and/or log into a trusted account. In this way, the client ticket granting module 1314 may update the client ticket with an increased reputation 1310 of 100. This allows the user 1306 to consume services at a higher access level because the user 1306 is now trusted.

Figure 14:
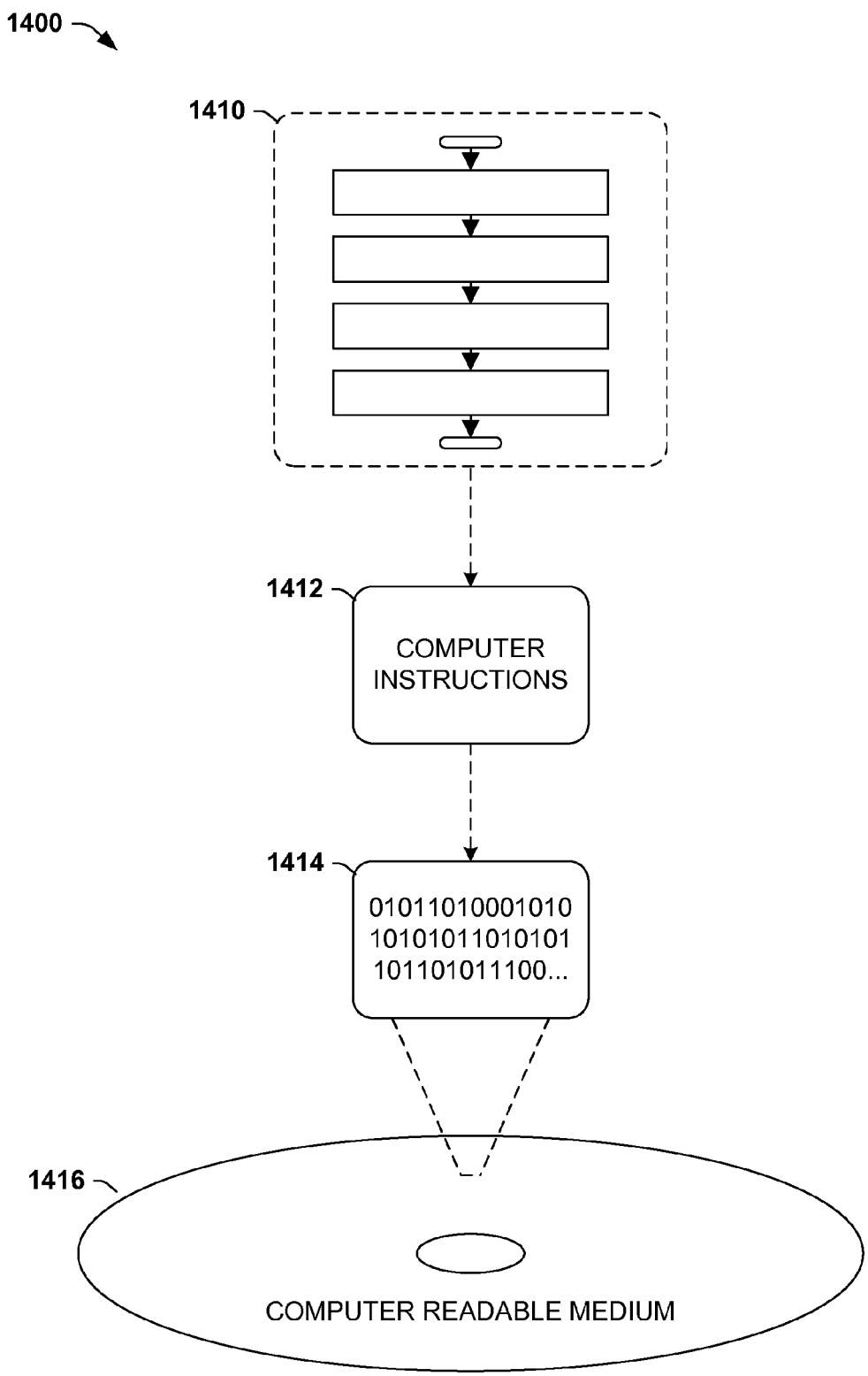
FIG. 14 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 14, wherein the implementation 1400 comprises a computer-readable medium 1416 (e.g., a CD-R, DVD-R, or a platter of a hard disk drive), on which is encoded computer-readable data 1414. This computer-readable data 1414 in turn comprises a set of computer instructions 1412 configured to operate according to one or more of the principles set forth herein. In one such embodiment 1400, the processor-executable computer instructions 1412 may be configured to perform a method 1410, such as the exemplary method 100 of FIG. 1, for example. In another such embodiment, the processor-executable instructions 1412 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 15:
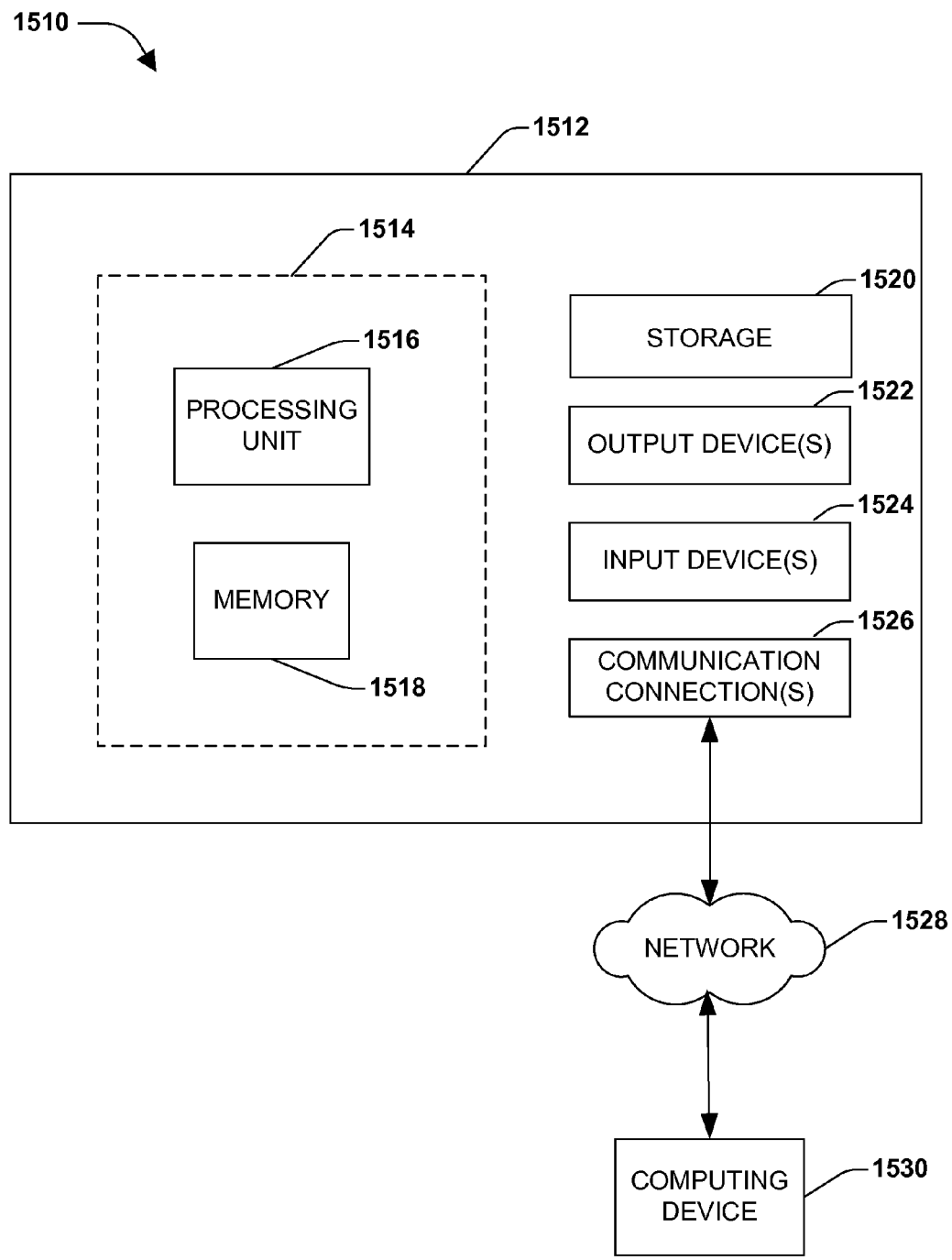
FIG. 15 illustrates an exemplary computing environment wherein one or more of the provisions set forth herein may be implemented.

FIG. 15 and the following discussion provide a brief, general description of a suitable computing environment to implement embodiments of one or more of the provisions set forth herein. The operating environment of FIG. 15 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 15 illustrates an example of a system 1510 comprising a computing device 1512 configured to implement one or more embodiments provided herein. In one configuration, computing device 1512 includes at least one processing unit 1516 and memory 1518. Depending on the exact configuration and type of computing device, memory 1518 may be volatile (such as RAM, for example), non-volatile (such as ROM, flash memory, etc., for example) or some combination of the two. This configuration is illustrated in FIG. 15 by dashed line 1514.

In other embodiments, device 1512 may include additional features and/or functionality. For example, device 1512 may also include additional storage (e.g., removable and/or non-removable) including, but not limited to, magnetic storage, optical storage, and the like. Such additional storage is illustrated in FIG. 15 by storage 1520. In one embodiment, computer readable instructions to implement one or more embodiments provided herein may be in storage 1520. Storage 1520 may also store other computer readable instructions to implement an operating system, an application program, and the like. Computer readable instructions may be loaded in memory 1518 for execution by processing unit 1516, for example. In another embodiment, a software and/or hardware trusted platform may be utilized in the systems and methods described herein. For example, a software emulation of a trusted platform may be configured to facilitate the delegation of applications tickets.

The term "computer readable media" as used herein includes computer storage media. Computer storage media includes volatile and nonvolatile, removable and non-removable media implemented in any method or technology for storage of information such as computer readable instructions or other data. Memory 1518 and storage 1520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1512. Any such computer storage media may be part of device 1512.

Device 1512 may also include communication connection(s) 1526 that allows device 1512 to communicate with other devices. Communication connection(s) 1526 may include, but is not limited to, a modem, a Network Interface Card (NIC), an integrated network interface, a radio frequency transmitter/receiver, an infrared port, a USB connection, or other interfaces for connecting computing device 1512 to other computing devices. Communication connection(s) 1526 may include a wired connection or a wireless connection. Communication connection(s) 1526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1512 may include input device(s) 1524 such as keyboard, mouse, pen, voice input device, touch input device, infrared cameras, video input devices, and/or any other input device. Output device(s) 1522 such as one or more displays, speakers, printers, and/or any other output device may also be included in device 1512. Input device(s) 1524 and output device(s) 1522 may be connected to device 1512 via a wired connection, wireless connection, or any combination thereof. In one embodiment, an input device or an output device from another computing device may be used as input device(s) 1524 or output device(s) 1522 for computing device 1512.

Components of computing device 1512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1512 may be interconnected by a network. For example, memory 1518 may be comprised of multiple physical memory units located in different physical locations interconnected by a network.

Those skilled in the art will realize that storage devices utilized to store computer readable instructions may be distributed across a network. For example, a computing device 1530 accessible via a network 1528 may store computer readable instructions to implement one or more embodiments provided herein. Computing device 1512 may access computing device 1530 and download a part or all of the computer readable instructions for execution. Alternatively, computing device 1512 may download pieces of the computer readable instructions, as needed, or some instructions may be executed at computing device 1512 and some at computing device 1530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs.

Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for validating service execution requests, comprising:
   one or more processing units; and
   memory comprising instructions that when executed by at least some of the one or more processing units perform operations, comprising:
   providing, to an anonymous user, a client ticket comprising a reputation for the anonymous user that is automatically determined based upon user interaction with one or more services through one or more applications;
   receiving a service execution request from an application with which the anonymous user is engaged, the service execution request comprising:
      the client ticket;
      an application ticket comprising an application identification (ID) identifying the application; and
      a request for execution of a service;
   identifying a service policy corresponding to the service;
   determining, from the service policy, a set of reputation thresholds based upon the application ID;
   comparing the reputation, comprised within the client ticket, to the set of reputation thresholds to determine an access level provided to the application by the service; and
   providing the application with access to the service according to the access level.

2. The system of claim 1, the set of reputation thresholds comprising:
   one or more reputation thresholds, a reputation threshold associated with a corresponding access level for the service.

3. The system of claim 2, the operations comprising:
   adjusting at least some of the one or more reputation thresholds based upon monitored service execution.

4. The system of claim 3, the adjusting comprising:
   increasing the at least some of the one or more reputation thresholds based upon detecting an attack.

5. The system of claim 1, the operations comprising:
   accessing the application ticket using information comprised within the client ticket.

6. The system of claim 1, the operations comprising:
   validating the service execution request based upon validating the application ID.

7. The system of claim 1, the operations comprising:
   providing a reputation challenge to the anonymous user;
   receiving a reputation challenge answer from the anonymous user; and
   updating the reputation based upon the reputation challenge answer.

8. The system of claim 1, the operations comprising:
   decreasing the reputation based upon at least one of:
      monitored service execution indicative of abuse;
      monitored service execution indicative of service spamming; or
      monitored service execution indicative of non-humanistic behavior.

9. The system of claim 1, the operations comprising:
   increasing the reputation based upon at least one of:
      human validation;
      patterns of humanistic behavior indicative of non-abuse; or
      matching monitored service execution of the anonymous user with statistical pattern access models.

10. The system of claim 1, the operations comprising:
    storing the client ticket as a cookie on a computer device with which the anonymous user is engaged.

11. The system of claim 1, the operations comprising:
    updating the reputation to indicate user denial of access to at least some of the one or more services.

12. The system of claim 1, the client ticket comprising:
    encrypted data of at least one of a client ID, reputation information, one or more state parameters of a client trusted platform, or a unique application ticket key.

13. The system of claim 1, the application ticket comprising at least one of:
    a copy of the client ticket without a one-time application ticket key; or
    encrypted data of at least one of the application ID, application ticket expiration information, or state parameters of a client trusted platform using a unique application ticket-key.

14. A method for validating server execution requests from anonymous applications, comprising:
    receiving a service execution request from an application with which an anonymous user is engaged, the service execution request comprising:
       a client ticket comprising a reputation for the anonymous user that is automatically determined based upon user interaction with one or more services through one or more applications;
       an application ticket comprising an application identification (ID) identifying the application; and
       a request for execution of a service;

identifying a service policy corresponding to the service;
determining, from the service policy, a set of reputation thresholds based upon the application ID;
comparing the reputation, comprised within the client ticket, to the set of reputation thresholds to determine an access level provided to the application by the service; and
providing the application with access to the service according to the access level.

15. The method of claim 14, the comparing comprising:
determining whether the reputation falls within a reputation threshold of the set of reputation thresholds; and
determining the access level based upon the reputation threshold.

16. The method of claim 14, comprising:
decreasing the reputation based upon a detected abusive access pattern.

17. The method of claim 14, comprising:
monitoring access patterns of one or more services for attack; and
upon detecting an attack, increasing one or more reputation thresholds of the set of reputation thresholds.

18. The method of claim 14, the providing comprising:
denying the application access to the service based upon determining the reputation falls within a low reputation threshold of the set of reputation thresholds.

19. A computer-readable medium comprising processor-executable instructions that when executed perform a method for validating service execution requests, comprising:
receiving a service execution request from an application with which an anonymous user is engaged, the service execution request comprising:
a client ticket comprising a reputation for the anonymous user;
an application ticket comprising an application (ID) identifying the application; and
a request for execution of a service;
identifying a service policy corresponding to the service;
determining, from the service policy, a set of reputation thresholds based upon the application ID;
comparing the reputation, comprised within the client ticket, to the set of reputation thresholds to determine an access level provided to the application by the service; and
providing the application with access to the service according to the access level.

20. The computer-readable medium of claim 19, the comparing comprising:
determining whether the reputation falls within a reputation threshold of the set of reputation thresholds; and
determining the access level based upon the reputation threshold.

* * * * *